(12) United States Patent
Teraoka (10) Patent No.: US 11,372,214 B2
(45) Date of Patent: Jun. 28, 2022

(54) CAMERA LENS

(71) Applicant: AAC Optics Solutions Pte. Ltd., Singapore (SG)

(72) Inventor: Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 425 days.

(21) Appl. No.: 16/726,980

(22) Filed: Dec. 26, 2019

(65) Prior Publication Data

US 2021/0041669 A1 Feb. 11, 2021

(30) Foreign Application Priority Data

Aug. 7, 2019 (JP) .............................. JP2019-145448

(51) Int. Cl.
  *G02B 13/00* (2006.01)
  *G02B 9/62* (2006.01)
(52) U.S. Cl.
  CPC ........... *G02B 13/0045* (2013.01); *G02B 9/62* (2013.01)

(58) Field of Classification Search
  CPC ........ G02B 9/62; G02B 9/64; G02B 13/0045; G02B 13/005; G02B 13/06; G02B 13/002; G02B 13/0015; G02B 13/001; G02B 27/0025; G02B 3/02
  USPC .......................... 359/658, 713, 752, 756, 761
  See application file for complete search history.

(56) References Cited

U.S. PATENT DOCUMENTS

2017/0108666 A1* 4/2017 Lee ..................... G02B 13/0045

* cited by examiner

*Primary Examiner* — Travis S Fissel
(74) *Attorney, Agent, or Firm* — W&G Law Group (57) ABSTRACT

The present disclosure provides a camera lens including six lenses, having good optical characteristics, having a wide angle and having a bright F number. The camera lens includes, from an object side: a first lens having a negative refractive power; a second lens having a positive refractive power; a third lens having a positive refractive power; a fourth lens having a negative refractive power; a fifth lens having a positive refractive power; and a sixth lens having a negative refractive power. The camera lens satisfies prescribed conditions.

3 Claims, 5 Drawing Sheets

CAMERA LENS

TECHNICAL FIELD

The present disclosure relates to an camera lens, and in particular, to a camera assembly for a cellphone using a camera element such as a high-pixel CCD or CMOS, a WEB camera lens, and the like. The camera lens includes 6 lenses and has good optical characteristics, a bright F number (hereinafter, FNO) with FNO being smaller than or equal to 2.20, and a wide angle with field of view (hereinafter, 2ω) being larger than or equal to 125°.

BACKGROUND

In recent years, various types of camera devices using camera elements such as CCD and CMOS have been widely used. With miniaturization and high performance of these camera elements, there is an urgent need for a camera lens having good optical characteristics and a bright FNO and a wide angle.

Development of a technology related to a camera lens including six lenses and having good optical characteristics and a bright FNO and a wide angle is gradually progressing. As such a camera lens including six lenses, a camera lens is provided which includes, from an object side: a first lens having a negative refractive power, a second lens having a positive refractive power, a third lens having a positive refractive power, a fourth lens having a negative refractive power, a fifth lens having a positive refractive power and a sixth lens having a negative refractive power.

In the related art, a camera lens including six lenses described above has been proposed. However, distribution of refractive power of the third and fourth lenses, a ratio of a curvature radius of an object side surface of the first lens to a curvature radius of an image side surface of the first lens, and a ratio of an abbe number of the third lens to an abbe number of the fourth lens are insufficient, and thus 2ω=119.4° to 119.6° and FNO=2.44, which provides an insufficiently wide angle and an insufficiently bright FNO.

In the related art, another camera lens including six lenses described above has been proposed. However, distribution of refractive power of the third lens, a ratio of a curvature radius of an object side surface of the first lens to a curvature radius of an image side surface of the first lens, and a ratio of an abbe number of the third lens to an abbe number of the fourth lens are insufficient, and thus 2ω is in a range from 119.9° to 120.0° and FNO is in a range from 2.24 to 2.28, which provides an insufficiently wide angle and an insufficiently bright FNO.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

A camera lens provided by exemplary embodiments of the present disclosure will hereinafter be described in detail. The camera lens LA includes, from an object side to an image side, a first lens L1, a second lens L2, a third lens L3, a fourth lens L4, a fifth lens L5 and a sixth lens L6 that constitute a lens system. A glass plate GF is arranged between the sixth lens L6 and an image plane. The glass plate GF may be a cover glass, various optical filters and the like. In the present disclosure, the glass plate GF may be arranged at different positions or may be omitted.

The first lens L1 has a negative refractive power, the second lens L2 has a positive refractive power, the third lens L3 has a positive refractive power, the fourth lens L4 has a negative refractive power, the fifth lens L5 has a positive refractive power, and the sixth lens L6 has a negative refractive power. Regarding surfaces of these six lenses, in order to correct various aberrations well, it is preferable to make each surface be an aspherical surface.

The camera lens LA satisfies conditions (1) to (4) as follows:

$$1.35 \leq f3/f \leq 1.63 \quad (1)$$

$$-10.00 < f4/f < -3.50 \quad (2)$$

$$0.20 \leq R1/R2 \leq 0.80 \quad (3)$$

$$3.50 \leq v3/v4 \leq 4.10 \quad (4)$$

where f denotes a focal length of the camera lens;
f3 denotes a focal length of the third lens;
f4 denotes a focal length of the fourth lens;
R1 denotes a curvature radius of an object side surface of the first lens;
R2 denotes a curvature radius of an image side surface of the first lens;
v3 denotes an abbe number of the third lens; and
v4 denotes an abbe number of the fourth lens.

The condition (1) defines the positive refractive power of the third lens L3. Out of a range of the condition (1), it is difficult to achieve good optical characteristics and a wide angle while making an FNO bright, and thus it is not preferable.

The condition (2) defines the negative refractive power of the fourth lens L4. Out of a range of the condition (2), it is difficult to achieve good optical characteristics and a wide angle while making an FNO bright, and thus it is not preferable.

The condition (3) defines a ratio of the curvature radius R1 of the object side surface of the first lens L1 to the curvature radius R2 of the image side surface of the first lens L1. Out of a range of the condition (3), it is difficult to achieve good optical characteristics and a wide angle while making an FNO bright, and thus it is not preferable.

The condition (4) defines a ratio of the abbe number v3 of the third lens L3 to the abbe number v4 of the fourth lens L4. Out of a range of the condition (4), it is difficult to achieve good optical characteristics and a wide angle while making an FNO bright, and thus it is not preferable.

The camera lens LA satisfies a condition (5) as follows:

$$1.20 \leq R7/R8 \leq 1.90 \quad (5)$$

where

R7 denotes a curvature radius of an object side surface of the fourth lens, and

R8 denotes a curvature radius of an image side surface of the fourth lens.

The condition (5) defines a ratio of the curvature radius R7 of the object side surface of the fourth lens L4 to the curvature radius R8 of the image side surface of the fourth lens L4. Within a range of the condition (5), it is advantageous to achieve good optical characteristics and a wide angle while making an FNO bright, and thus it is preferable.

The camera lens LA satisfies a condition (6) as follows:

$$-0.40 \leq f3/f4 \leq -0.10 \quad (6)$$

where f3 denotes the focal length of the third lens, and f4 denotes the focal length of the fourth lens.

The condition (6) defines a ratio of the focal length f3 of the third lens L3 to the focal length f4 of the fourth lens L4. Within a range of the condition (6), it is advantageous to achieve good optical characteristics and a wide angle while making an FNO bright, and thus it is preferable.

Each of the six lenses constituting the camera lens LA satisfies the above-mentioned configuration and condition, thereby obtaining a camera lens having good optical characteristics and a wide angle and having a bright FNO.

f: focal length of the camera lens LA;
f1: focal length of the first lens L1;
f2: focal length of the second lens L2;
f3: focal length of the third lens L3;
f4: focal length of the fourth lens L4;
f5: focal length of the fifth lens L5;
f6: focal length of the sixth lens L6;
FNO: F number;
2ω: FOV (field of view);
S1: aperture;
R: curvature radius of an optical surface, a central curvature radius for a lens;
R1: curvature radius of the object side surface of the first lens L1;
R2: curvature radius of the image side surface of the first lens L1;
R3: curvature radius of an object side surface of the second lens L2;
R4: curvature radius of an image side surface of the second lens L2;
R5: curvature radius of an object side surface of the third lens L3;
R6: curvature radius of an image side surface of the third lens L3;
R7: curvature radius of the object side surface of the fourth lens L4;
R8: curvature radius of the image side surface of the fourth lens L4;
R9: curvature radius of an object side surface of the fifth lens L5;
R10: curvature radius of an image side surface of the fifth lens L5;
R11: curvature radius of an object side surface of the sixth lens L6;
R12: curvature radius of an image side surface of the sixth lens L6;
R13: curvature radius of an object side surface of the glass plate GF;
R14: curvature radius of an image side surface of the glass plate GF;
d: center thickness of a lens and distance between lenses;
d1: center thickness of the first lens;
d2: on-axis distance from the image side surface of the first lens L1 to the object side surface of the second lens L2;
d3: center thickness of the second lens L2;
d4: on-axis distance from the image side surface of the second lens L2 to the aperture S1;
d5: on-axis distance from the aperture S1 to the object side surface of the third lens L3;
d6: center thickness of the third lens L3;
d7: on-axis distance from the image side surface of the third lens L3 to the object side surface of the fourth lens L4;
d8: center thickness of the fourth lens L4;
d9: on-axis distance from the image side surface of the fourth lens L4 to the object side surface of the fifth lens L5;
d10: center thickness of the fifth lens L5;
d11: on-axis distance from the image side surface of the fifth lens L5 to the object side surface of the sixth lens L6;
d12: center thickness of the sixth lens L6;
d13: on-axis distance from the image side surface of the sixth lens L6 to the object side surface of the glass plate GF;
d14: center thickness of the glass plate GF;
d15: on-axis distance from the image side surface of the glass plate GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the glass plate GF;
v: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the glass plate GF;
TTL: optical length (a total optical length from the object side surface of the first lens L1 to the image plane of the camera lens along an optic axis);

LB: on-axis distance from the image side surface of the sixth lens L6 to the image plane (including a thickness of the glass plate GF); and IH: image height.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (7)$$

where R denotes the curvature radius on an axis, k denotes a conic coefficient, and A4, A6, A10, A12, A14 and A16 denote aspherical coefficients.

For convenience, an aspheric surface of each lens surface uses the aspheric surfaces shown in the above formula (7). However, the present disclosure is not limited to the aspherical polynomials form shown in the formula (7).

Embodiment 1

Figure 1:
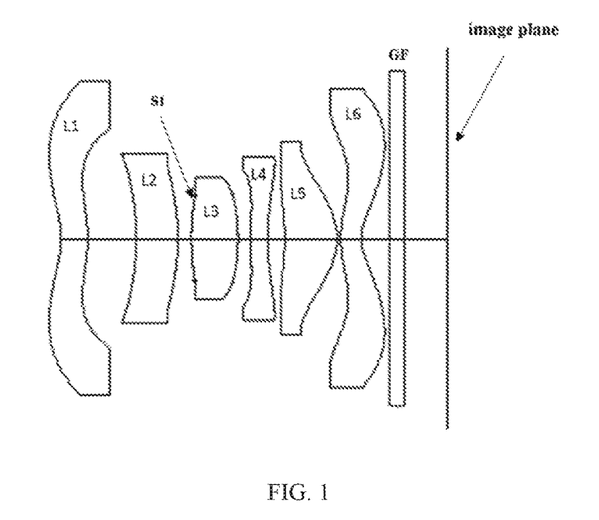
FIG. 1 is a schematic diagram of a structure of a camera lens LA in accordance with Embodiment 1 of the present disclosure.

FIG. 1 is a schematic diagram of a structure of a camera lens LA in accordance with Embodiment 1 of the present disclosure. In Embodiment 1, the camera lens LA includes a first lens L1 to a sixth lens L6. In the following, Table 1 shows respective curvature radiuses R of the object side and the image side of each of the first lens L1 to the sixth lens L6, the center thickness of each lens or the distance d between lenses, the refractive index nd and the abbe number v, Table 2 shows conic coefficients k and aspherical coefficients, and Table 3 shows 2ω, FNO, f, f1, f2, f3, f4, f5, f6, TTL, and IH.

TABLE 1

|  | R |  | d |  | nd | v d | Effective radius (mm) |
|---|---|---|---|---|---|---|---|
| R1 | −1.36152 | d1 = | 0.385 | nd1 | 1.5439 | v 1 55.95 | 2.163 |
| R2 | −1.77883 | d2 = | 0.690 |  |  |  | 1.522 |
| R3 | −3.41899 | d3 = | 0.600 | nd2 | 1.6150 | v 2 25.92 | 1.170 |
| R4 | −2.74618 | d4 = | 0.238 |  |  |  | 0.976 |
| S1 | Infinity | d5 = | −0.044 |  |  |  | 0.594 |
| R5 | 3.64703 | d6 = | 0.665 | nd3 | 1.5267 | v 3 76.90 | 0.637 |
| R6 | −2.76546 | d7 = | 0.177 |  |  |  | 0.841 |
| R7 | 5.12995 | d8 = | 0.240 | nd4 | 1.6713 | v 4 19.24 | 0.936 |
| R8 | 2.73726 | d9 = | 0.251 |  |  |  | 1.129 |
| R9 | −3.04305 | d10 = | 0.748 | nd5 | 1.5439 | v 5 55.95 | 1.208 |
| R10 | −0.77466 | d11 = | 0.050 |  |  |  | 1.334 |
| R11 | 1.14091 | d12 = | 0.300 | nd6 | 1.6447 | v 6 22.48 | 1.751 |
| R12 | 0.56675 | d13 = | 0.400 |  |  |  | 2.055 |
| R13 | Infinity | d14 = | 0.210 | nd7 | 1.5168 | v 7 64.17 | 2.251 |
| R14 | Infinity | d15 = | 0.620 |  |  |  | 2.322 |

Reference wavelength = 588 nm

TABLE 3

| 2ω (°) | 130.01 |
|---|---|
| FN0 | 2.04 |
| f (mm) | 1.911 |
| f1 (mm) | −15.808 |
| f2 (mm) | 16.957 |
| f3 (mm) | 3.097 |
| f4 (mm) | −9.117 |
| f5 (mm) | 1.712 |
| f6 (mm) | −2.198 |
| TTL (mm) | 5.530 |
| LB (mm) | 1.230 |
| IH (mm) | 2.619 |

Table 16 which will be described later shows values corresponding to the respective values of the first to fifth embodiments and the parameters defined by the conditions (1) to (6).

As shown in Table 16, Embodiment 1 satisfies the conditions (1) to (6).

Figure 2:
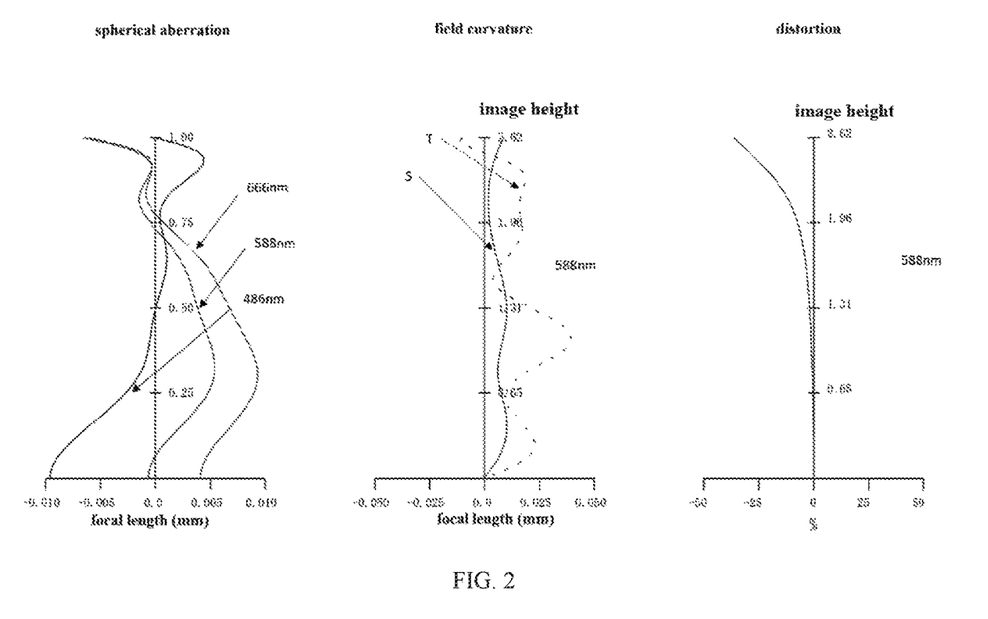
FIG. 2 is a schematic diagram of a spherical aberration, a field curvature and a distortion of the camera lens LA in accordance with Embodiment 1 of the present disclosure.

A spherical aberration, a field curvature and a distortion of the camera lens LA in Embodiment 1 are as shown in FIG. 2. Further, the field curvature S is a field curvature in a sagittal direction and T is a field curvature in a tangential direction, and same for Embodiments 2 to 5. It is known that the camera lens LA in Embodiment 1 is as shown in Table 3, FNO=2.04 is bright and 2ω=130.01° is wide, and as shown in FIG. 2, it has good optical characteristics.

Embodiment 2

Figure 3:
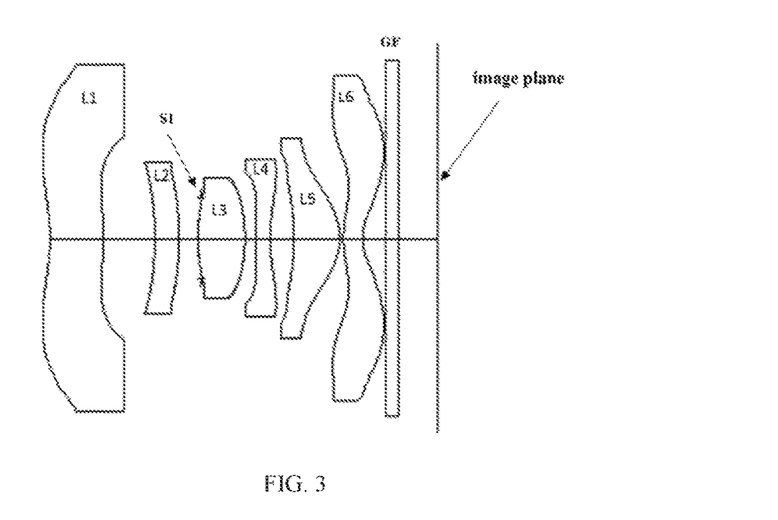
FIG. 3 is a schematic diagram of a structure of a camera lens LA in accordance with Embodiment 2 of the present disclosure.

FIG. 3 is a schematic diagram of a structure of a camera lens LA in accordance with Embodiment 2 of the present disclosure. In Embodiment 2, the camera lens LA includes a first lens L1 to a sixth lens L6. In the following, Table 4 shows respective curvature radiuses R of the object side and the image side of each of the first lens L1 to the sixth lens L6, the center thickness of each lens or the distance d between lenses, the refractive index nd and the abbe number v, Table 5 shows conic coefficients k and aspherical coefficients, and Table 6 shows 2ω, FNO, f, f1, f2, f3, f4, f5, f6, TTL, and IH.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | −3.884E+00 | 1.941E−01 | −1.197E−01 | 5.738E−02 | −1.844E−02 | 3.802E−03 | −4.530E−04 | 2.341E−05 |
| R2 | −1.289E+01 | 7.123E−02 | 2.193E−01 | −3.939E−01 | 3.614E−01 | −1.859E−01 | 5.183E−02 | −6.111E−03 |
| R3 | −1.977E+00 | 3.422E−02 | −1.441E−01 | 3.074E−01 | −3.808E−01 | 2.667E−01 | −9.919E−02 | 1.511E−02 |
| R4 | −1.367E+01 | −8.547E−03 | 2.452E−02 | −6.002E−02 | 8.817E−02 | 1.183E−01 | −1.588E−01 | 6.328E−02 |
| R5 | 7.369E+00 | 6.300E−02 | 1.201E−01 | −4.583E+00 | 3.071E+01 | −1.029E+02 | 1.706E+02 | −1.125E+02 |
| R6 | −2.113E+00 | −1.020E−01 | −2.237E−01 | 1.036E+00 | −2.218E+00 | 1.496E+00 | 2.009E−01 | −5.788E−01 |
| R7 | 1.053E+01 | −2.540E−01 | −2.525E−02 | 7.598E−02 | 4.964E−01 | −1.068E+00 | 4.429E−01 | 5.844E−02 |
| RS | −8.568E+00 | −6.047E−02 | −9.984E−01 | 2.922E−01 | −2.431E−01 | 3.287E−02 | 4.543E−02 | −1.814E−02 |
| R9 | −2.139E+01 | 1.077E−01 | −3.007E−01 | 7.763E−01 | −1.011E+00 | 6.811E−01 | −2.234E−01 | 2.657E−02 |
| R10 | −2.849E+00 | −6.692E−03 | −2.794E−02 | −2.776E−01 | 8.152E−01 | −7.849E−01 | 3.325E−01 | −5.278E−02 |
| R11 | −1.287E+01 | −6.518E−02 | −2.047E−01 | 2.696E−01 | −1.614E−01 | 5.276E−02 | −8.935E−03 | 6.124E−04 |
| R12 | −4.329E+00 | −1.542E−01 | 7.016E−02 | −2.136E−02 | 3.822E−03 | −4.680E−04 | 3.493E−05 | −3.863E−08 |

TABLE 4

| | R | d | | nd | | v d | Effective radius (mm) |
|---|---|---|---|---|---|---|---|
| R1 | -2.65117 | d1 = | 0.833 | nd1 | 1.5439 | v 1 55.95 | 2.599 |
| R2 | -3.76272 | d2 = | 0.798 | | | | 1.530 |
| R3 | -3.97329 | d3 = | 0.375 | nd2 | 1.6713 | v 2 19.24 | 1.137 |
| R4 | -3.47482 | d4 = | 0.337 | | | | 1.023 |
| S1 | Infinity | d5 = | -0.046 | | | | 0.610 |
| R5 | 3.04673 | d6 = | 0.725 | nd3 | 1.5267 | v 3 76.90 | 0.704 |
| R6 | -2.52803 | d7 = | 0.162 | | | | 0.909 |
| R7 | 4.34095 | d8 = | 0.230 | nd4 | 1.6713 | v 4 19.24 | 0.993 |
| R8 | 2.34646 | d9 = | 0.380 | | | | 1.180 |
| R9 | -2.75911 | d10 = | 0.710 | nd5 | 1.5439 | v 5 55.95 | 1.291 |
| R10 | -0.77308 | d11 = | 0.050 | | | | 1.493 |
| R11 | 1.21172 | d12 = | 0.300 | nd6 | 1.6150 | v 6 25.92 | 2.177 |
| R12 | 0.57775 | d13 = | 0.346 | | | | 2.401 |
| R13 | Infinity | d14 = | 0.210 | nd7 | 1.5168 | v 7 64.17 | 2.581 |
| R14 | Infinity | d15 = | 0.590 | | | | 2.649 |

Reference wavelength = 588 nm

TABLE 5

| | Conic coefficient | Aspherical surface coefficients | | | | | | |
|---|---|---|---|---|---|---|---|---|
| | k | A4 | A6 | A8 | A10 | A12 | A14 | A16 |
| R1 | -1.729E+00 | 1.092E-01 | -4.385E-02 | 1.542E-02 | -3.783E-03 | 5.941E-04 | -5.245E-05 | 1.934E-06 |
| R2 | -1.854E+01 | 1.036E-01 | 8.505E-03 | -7.381E-02 | 9.840E-02 | -6.310E-02 | 2.094E-02 | -2.807E-03 |
| R3 | -7.543E-01 | 4.812E-02 | -1.193E-01 | 2.153E-01 | -2.508E-01 | 1.673E-01 | -6.072E-02 | 9.454E-03 |
| R4 | -1.677E+01 | 1.046E-02 | -5.614E-02 | 1.397E-01 | -2.013E-01 | 1.459E-01 | -4.924E-02 | 6.168E-03 |
| R5 | 0.000E+00 | 5.882E-02 | -1.030E-01 | 4.386E-01 | -1.955E+00 | 3.948E+00 | -3.575E+00 | 8.594E-01 |
| R6 | -1.281E+00 | -9.966E-02 | 1.326E-01 | -3.616E-01 | 1.089E+00 | -2.582E+00 | 2.668E-00 | -1.030E+00 |
| R7 | -1.202E+01 | -2.744E-01 | 7.403E-02 | 2.186E-01 | -7.752E-01 | 1.442E+00 | -1.609E+00 | 6.623E-01 |
| R8 | -1.156E+01 | -9.221E-02 | 9.499E-03 | 3.385E-02 | 5.094E-02 | -1.398E-01 | 9.124E-02 | -2.026E-02 |
| R9 | -8.392E+00 | 8.239E-02 | -2.628E-01 | 6.456E-01 | -8.283E-01 | 6.063E-01 | -2.451E-01 | 4.078E-02 |
| R10 | -2.332E+00 | 6.203E-02 | -1.712E-01 | 3.792E-02 | 2.611E-01 | -2.489E-01 | 8.423E-02 | -9.809E-03 |
| R11 | -1.545E+01 | -1.195E-01 | -7.327E-02 | 8.995E-02 | -3.350E-02 | 6.082E-03 | -5.364E-04 | 1.753E-05 |
| R12 | -4.439E+00 | -1.461E-01 | 7.135E-02 | -2.996E-02 | 9.678E-03 | -2.124E-03 | 2.668E-04 | -1.393E-05 |

TABLE 6

| 2ω (°) | 126.00 |
|---|---|
| FNO | 2.04 |
| f (mm) | 2.018 |
| f1 (mm) | -22.419 |
| f2 (mm) | 31.715 |
| f3 (mm) | 2.747 |
| f4 (mm) | -7.984 |
| f5 (mm) | 1.754 |
| f6 (mm) | -2.192 |
| TTL (mm) | 6.000 |
| LB (mm) | 1.146 |
| IH (mm) | 2.911 |

As shown in Table 16, Embodiment 2 satisfies the conditions (1) to (6).

Figure 4:
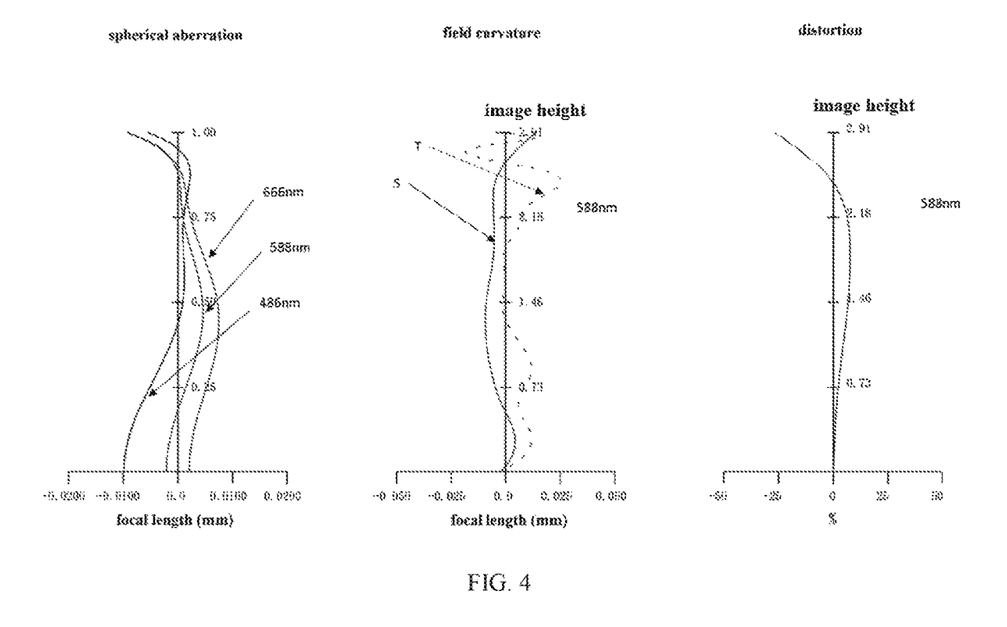
FIG. 4 is a schematic diagram of a spherical aberration, a field curvature and a distortion of the camera lens LA in accordance with Embodiment 2 of the present disclosure.

A spherical aberration, a field curvature and a distortion of the camera lens LA in Embodiment 2 are as shown in FIG. 4. It is known that the camera lens LA in Embodiment 2 is as shown in Table 6, FNO=2.04 is bright and 2ω=126.00° is wide, and as shown in FIG. 4, it has good optical characteristics.

Embodiment 3

Figure 5:
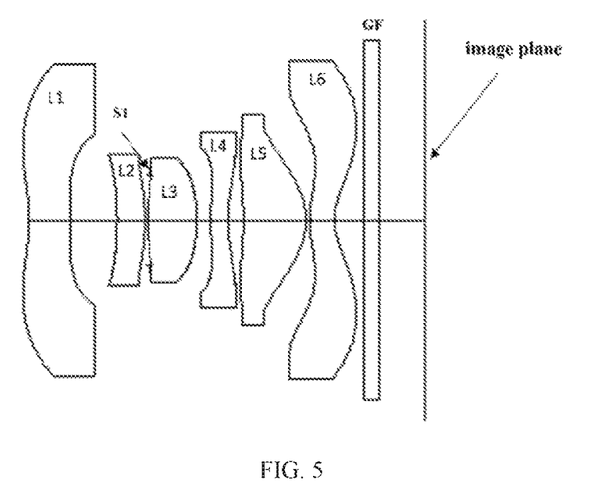
FIG. 5 is a schematic diagram of a structure of a camera lens LA in accordance with Embodiment 3 of the present disclosure.

FIG. 5 is a schematic diagram of a structure of a camera lens LA in accordance with Embodiment 3 of the present disclosure. In Embodiment 3, the camera lens LA includes a first lens L1 to a sixth lens L6. In the following, Table 7 shows respective curvature radiuses R of the object side and the image side of each of the first lens L1 to the sixth lens L6, the center thickness of each lens or the distance d between lenses, the refractive index nd and the abbe number v, Table 8 shows conic coefficients k and aspherical coefficients, and Table 9 shows 2ω, FNO, f, f1, f2, f3, f4, f5, f6, TTL, and IH.

TABLE 7

| | R | d | | nd | | v d | Effective radius (mm) |
|---|---|---|---|---|---|---|---|
| R1 | -2.35834 | d1 = | 0.572 | nd1 | 1.5439 | v 1 55.95 | 2.043 |
| R2 | -9.07052 | d2 = | 0.632 | | | | 1.136 |
| R3 | -4.81181 | d3 = | 0.377 | nd2 | 1.6150 | v 2 25.92 | 0.869 |
| R4 | -3.22151 | d4 = | 0.069 | | | | 0.734 |
| S1 | Infinity | d5 = | -0.019 | | | | 0.586 |
| Rd | 4.81543 | d6 = | 0.665 | nd3 | 1.5286 | v 3 76.98 | 0.636 |
| R6 | -2.20609 | d7 = | 0.183 | | | | 0.828 |
| R7 | 2.37637 | d8 = | 0.240 | nd4 | 1.6713 | v 4 19.24 | 0.944 |
| R8 | 1.89617 | d9 = | 0.208 | | | | 1.158 |
| R9 | -4.01822 | d10 = | 0.860 | nd5 | 1.5439 | v 5 55.95 | 1.256 |
| R10 | -0.79601 | d11 = | 0.050 | | | | 1.385 |
| R11 | 1.34222 | d12 = | 0.330 | nd6 | 1.6447 | v 6 22.48 | 1.737 |
| R12 | 0.60463 | d13 = | 0.400 | | | | 2.085 |
| R13 | Infinity | d14 = | 0.210 | nd7 | 1.5168 | v 7 64.17 | 2.284 |
| R14 | Infinity | d15 = | 0.620 | | | | 2.349 |

Reference wavelength = 588 nm

TABLE 8

| | Conic coefficient | Aspherical surface coefficients | | | | | | |
|---|---|---|---|---|---|---|---|---|
| | k | A4 | A6 | A8 | A10 | A12 | A14 | A16 |
| R1 | −1.320E+00 | 2.157E−01 | −1.308E−01 | 6.658E−02 | −2.341E−02 | 5.272E−03 | −6.751E−04 | 3.681E−05 |
| R2 | 3.353E+00 | 2.457E−01 | 1.907E−01 | −9.984E−01 | 2.022E+00 | −2.169E+00 | 1.244E+00 | −2.956E−01 |
| R3 | 2.938E+00 | −4.856E−02 | −2.291E−01 | 1.180E+00 | −3.369E+00 | 5.799E+00 | −5.438E+00 | 2.118E+00 |
| R4 | −1.370E+01 | −4.188E−02 | −9.657E−02 | 8.606E−01 | −2.740E+00 | 5.758E+00 | −7.556E+00 | 4.583E+00 |
| R5 | 2.380E+00 | 3.384E−02 | −4.427E−02 | −1.131E+00 | 9.405E+00 | −3.816E+01 | 7.357E+01 | −5.721E+01 |
| R6 | 4.368E−01 | −3.058E−01 | 3.966E−01 | −6.390E−01 | 7.482E−01 | −1.261E+00 | 1.543E+00 | −1.243E+00 |
| R7 | −4.815E+00 | −4.642E−01 | 2.932E−01 | −7.319E−01 | 2.413E+00 | −4.299E+00 | 3.992E+00 | −1.645E+00 |
| R8 | −1.075E+01 | −4.451E−02 | −3.384E−01 | 9.509E−01 | −1.252E+00 | 9.423E−01 | −3.852E−01 | 6.253E−02 |
| R9 | −2.543E+01 | 1.080E−01 | −2.545E−01 | 6.260E−01 | −7.756E−01 | 4.966E−01 | −1.520E−01 | 1.534E−02 |
| R10 | −2.358E+00 | 1.136E−02 | −6.130E−02 | −1.294E−01 | 3.285E−01 | −2.312E−01 | 7.343E−02 | −9.438E−03 |
| R11 | −1.857E+01 | −1.343E−01 | −6.713E−02 | 7.845E−02 | −2.925E−02 | 6.582E−03 | −9.284E−04 | 5.874E−05 |
| R12 | −4.446E+00 | −1.621E−01 | 8.335E−02 | −3.653E−02 | 1.127E−02 | −2.123E−03 | 2.008E−04 | −6.138E−06 |

TABLE 9

| 2ω (°) | 130.03 |
|---|---|
| FNO | 2.04 |
| f (mm) | 1.826 |
| f1 (mm) | −6.041 |
| f2 (mm) | 14.551 |
| f3 (mm) | 2.960 |
| f4 (mm) | −17.501 |
| f5 (mm) | 1.668 |
| f6 (mm) | −2.071 |
| TTL (mm) | 5.397 |
| LB (mm) | 1.230 |
| IH (mm) | 2.619 |

As shown in Table 16, Embodiment 3 satisfies the conditions (1) to (6).

Figure 6:
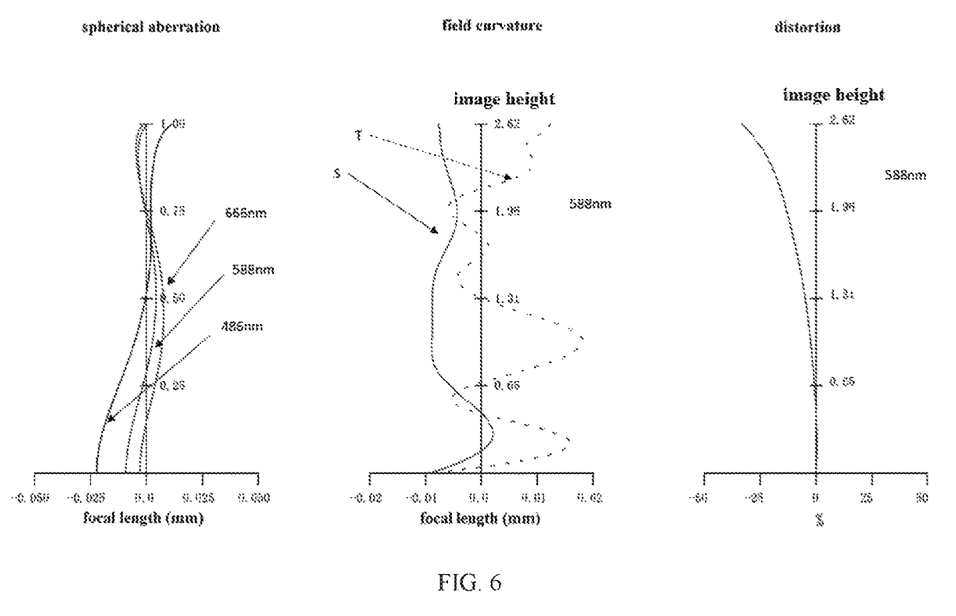
FIG. 6 is a schematic diagram of a spherical aberration, a field curvature and a distortion of the camera lens LA in accordance with Embodiment 3 of the present disclosure.

A spherical aberration, a field curvature and a distortion of the camera lens LA in Embodiment 3 are as shown in FIG. 6. It is known that the camera lens LA in Embodiment 3 is as shown in Table 9, FNO=2.04 is bright and 2ω=130.03° is wide, and as shown in FIG. 6, it has good optical characteristics.

Embodiment 4

Figure 7:
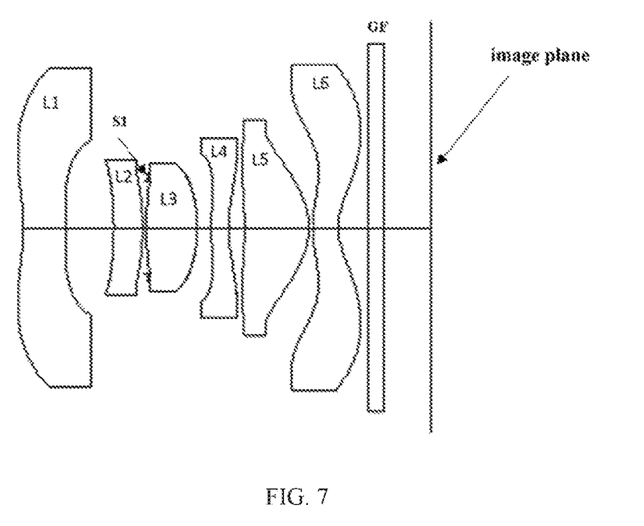
FIG. 7 is a schematic diagram of a structure of a camera lens LA in accordance with Embodiment 4 of the present disclosure.

FIG. 7 is a schematic diagram of a structure of a camera lens LA in accordance with Embodiment 4 of the present disclosure. In Embodiment 4, the camera lens LA includes a first lens L1 to a sixth lens L6. In the following, Table 10 shows respective curvature radiuses R of the object side and the image side of each of the first lens L1 to the sixth lens L6, the center thickness of each lens or the distance d between lenses, the refractive index nd and the abbe number ν, Table 11 shows conic coefficients k and aspherical coefficients, and Table 12 shows 2ω, FNO, f, f1, f2, f3, f4, f5, f6, TTL, and IH.

TABLE 10

| | R | d | | nd | | ν d | Effective radius (mm) |
|---|---|---|---|---|---|---|---|
| R1 | −2.28060 | d1 = | 0.576 | nd1 | 1.5439 | ν 1 55.95 | 2.066 |
| R2 | −6.72720 | d2 = | 0.622 | | | | 1.150 |
| R3 | −4.72982 | d3 = | 0.388 | nd2 | 1.6150 | ν 2 25.92 | 0.884 |
| R4 | −2.98730 | d4 = | 0.078 | | | | 0.750 |
| S1 | Infinity | d5 = | −0.020 | | | | 0.587 |
| R5 | 5.20615 | d6 = | 0.671 | nd3 | 1.5267 | ν 3 76.90 | 0.637 |
| R6 | −2.15712 | d7 = | 0.152 | | | | 0.830 |
| R7 | 2.50552 | d8 = | 0.240 | nd4 | 1.6613 | ν 4 20.37 | 0.931 |
| R8 | 1.91683 | d9 = | 0.215 | | | | 1.150 |
| R9 | −3.48279 | d10 = | 0.868 | nd5 | 1.5439 | ν 5 55.95 | 1.249 |
| R10 | −0.79184 | d11 = | 0.050 | | | | 1.371 |
| R11 | 1.32596 | d12 = | 0.330 | nd6 | 1.6447 | ν 6 22.48 | 1.736 |
| R12 | 0.60481 | d13 = | 0.400 | | | | 2.084 |
| R13 | Infinity | d14 = | 0.210 | nd7 | 1.5168 | ν 7 64.17 | 2.282 |
| R14 | Infinity | d15 = | 0.619 | | | | 2.348 |

Reference wavelength = 588 nm

TABLE 11

| | Conic coefficient | Aspherical surface coefficients | | | | | | |
|---|---|---|---|---|---|---|---|---|
| | k | A4 | A6 | A8 | A10 | A12 | A14 | A16 |
| R1 | −1.301E+00 | 2.140E−01 | −1.286E−01 | 6.466E−02 | −2.243E−02 | 4.970E−03 | −6.247E−04 | 3.347E−05 |
| R2 | −1.686E+01 | 2.415E−01 | 1.509E−01 | −8.609E−01 | 1.726E+00 | −1.805E+00 | −1.001E+00 | −2.287E−01 |
| R3 | 2.740E+00 | −3.077E−02 | −2.751E−01 | 1.259E+00 | −3.478E+00 | 5.736E+00 | −5.086E−00 | 1.868E+00 |
| R4 | −1.389E+01 | 8.448E−03 | −3.457E−01 | 1.477E+00 | −3.996E+00 | 7.541E+00 | −8.726E−00 | 4.640E+00 |
| R5 | 1.378E+01 | 1.050E−01 | −4.094E−01 | 2.333E−01 | 4.543E+00 | −2.505E+01 | 5.300E+01 | −4.340E+01 |
| R6 | 4.132E−01 | −3.227E−01 | 4.614E−01 | −7.123E−01 | 7.565E−01 | −1.274E+00 | 1.689E−00 | −1.355E+00 |
| R7 | −6.228E+00 | −4.867E−01 | 3.320E−01 | −7.953E−01 | 2.374E+00 | −4.076E+00 | 3.775E−00 | −1.600E+00 |
| R8 | −1.014E+01 | −4.893E−02 | −3.098E−01 | 8.903E−01 | −1.197E+00 | 9.227E−01 | −3.860E−01 | 6.389E−02 |
| R9 | −2.793E+01 | 8.592E−02 | −1.988E−01 | 5.746E−01 | −7.795E−01 | 5.409E−01 | −1.825E−01 | 2.205E−02 |
| R10 | −2.286E+00 | 9.800E−03 | −8.161E−02 | −7.457E−02 | 2.495E−01 | −1.739E−01 | 5.489E−02 | −7.375E−03 |
| R11 | −1.692E+01 | −1.458E−01 | −5.011E−02 | 6.576E−02 | −2.364E−02 | 4.937E−03 | −6.290E−04 | 3.430E−05 |
| R12 | −4.359E+00 | −1.660E−01 | 8.773E−02 | −3.857E−02 | 1.157E−02 | −2.062E−03 | 1.777E−04 | −4.178E−06 |

TABLE 12

| | |
|---|---|
| 2ω (°) | 130.03 |
| FNO | 2.04 |
| f (mm) | 1.845 |
| f1 (mm) | −6.647 |
| f2 (mm) | 12.166 |
| f3 (mm) | 2.990 |
| f4 (mm) | −14.738 |
| f5 (mm) | 1.692 |
| f6 (mm) | −2.103 |
| TTL (mm) | 5.399 |
| LB (mm) | 1.229 |
| IH (mm) | 2.619 |

As shown in Table 16, Embodiment 4 satisfies the conditions (1) to (6).

Figure 8:
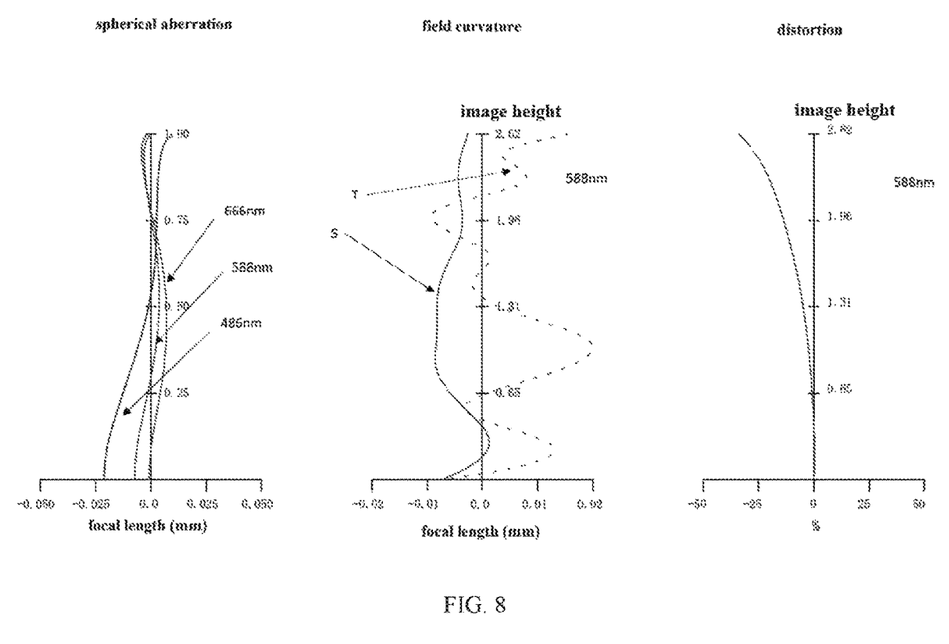
FIG. 8 is a schematic diagram of a spherical aberration, a field curvature and a distortion of the camera lens LA in accordance with Embodiment 4 of the present disclosure.

A spherical aberration, a field curvature and a distortion of the camera lens LA in Embodiment 4 are as shown in FIG. 8. It is known that the camera lens LA in Embodiment 4 is as shown in Table 12, FNO=2.04 is bright and 2ω=130.03° is wide, and as shown in FIG. 8, it has good optical characteristics.

Embodiment 5

Figure 9:
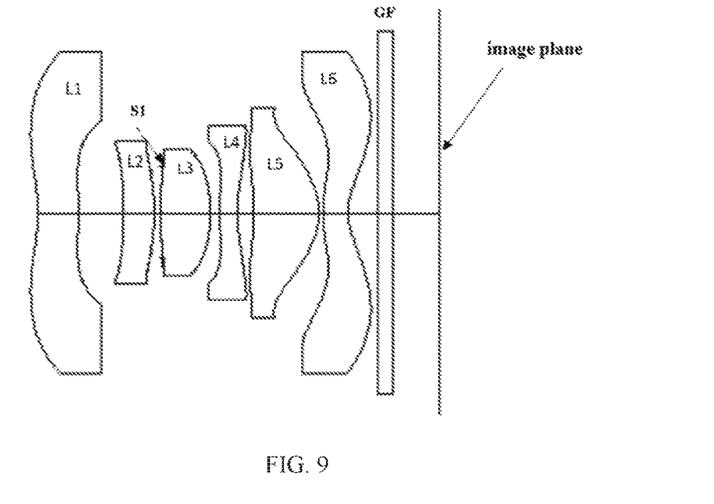
FIG. 9 is a schematic diagram of a structure of a camera lens LA in accordance with Embodiment 5 of the present disclosure.

FIG. 9 is a schematic diagram of a structure of a camera lens LA in accordance with Embodiment 5 of the present disclosure. In Embodiment 5, the camera lens LA includes a first lens L1 to a sixth lens L6. In the following, Table 13 shows respective curvature radiuses R of the object side and the image side of each of the first lens L1 to the sixth lens L6, the center thickness of each lens or the distance d between lenses, the refractive index nd and the abbe number v, Table 14 shows conic coefficients k and aspherical coefficients, and Table 15 shows 2ω, FNO, f, f1, f2, f3, f4, f5, f6, TTL, and IH.

TABLE 13

| | R | d | | nd | v d | Effective radius (mm) |
|---|---|---|---|---|---|---|
| R1 | −2.11022 | d1 = | 0.550 | nd1 1.5439 | v 1 55.95 | 2.083 |
| R2 | −4.81308 | d2 = | 0.614 | | | 1.187 |
| R3 | −4.93707 | d3 = | 0.401 | nd2 1.6150 | v 2 25.92 | 0.913 |
| R4 | −2.92729 | d4 = | 0.102 | | | 0.779 |
| S1 | Infinity | d5 = | −0.019 | | | 0.589 |
| RS | 5.77844 | d6 = | 0.670 | nd3 1.5267 | v 3 76.90 | 0.638 |

TABLE 13-continued

| | R | d | | nd | v d | Effective radius (mm) |
|---|---|---|---|---|---|---|
| R6 | −2.11549 | d7 = | 0.120 | | | 0.827 |
| R7 | 2.63456 | d8 = | 0.240 | nd4 1.6509 | v 4 21.52 | 0.916 |
| R8 | 1.90251 | d9 = | 0.221 | | | 1.137 |
| R9 | −3.40685 | d10 = | 0.886 | nd5 1.5439 | v 5 55.95 | 1.239 |
| R10 | −0.79943 | d11 = | 0.050 | | | 1.350 |
| R11 | 1.32822 | d12 = | 0.335 | nd6 1.6447 | v 6 22.48 | 1.729 |
| R12 | 0.60986 | d13 = | 0.400 | | | 2.086 |
| R13 | Infinity | d14 = | 0.210 | nd7 1.5168 | v 7 64.17 | 2.281 |
| R14 | Infinity | d15 = | 0.620 | | | 2.346 |

Reference wavelength = 588 nm

TABLE 14

| | Conic coefficient | Aspherical surface coefficients | | | | | | |
|---|---|---|---|---|---|---|---|---|
| | k | A4 | A6 | A8 | A10 | A12 | A14 | A16 |
| R1 | −1.315E+00 | 2.190E−01 | −1.298E−01 | 6.388E−02 | −2.167E−02 | 4.699E−03 | −5.789E−04 | 3.051E−05 |
| R2 | −2.000E+01 | 2.265E−01 | 1.217E−01 | −6.836E−01 | 1.282E+00 | −1.249E+00 | 6.453E−01 | −1.375E−01 |
| R3 | 2.376E+00 | −1.082E−02 | −3.127E−01 | 1.302E+00 | −3.365E+00 | 5.092E+00 | −4.109E+00 | 1.372E+00 |
| R4 | −1.413E+01 | 2.537E−02 | −3.355E−01 | 1.256E+00 | −3.413E+00 | 6.336E+00 | −6.824E+00 | 3.246E+00 |
| R5 | 2.578E+01 | 1.192E−01 | −2.666E−01 | −9.784E−01 | 8.902E+00 | −3.382E+01 | 6.237E+01 | −4.747E+01 |
| R6 | 1.755E−01 | −3.359E−01 | 6.550E−01 | −1.589E+00 | 3.033E+00 | −4.785E+00 | 4.619E+00 | −2.389E+00 |
| R7 | −6.274E+00 | −5.114E−01 | 4.645E−01 | −1.138E+00 | 2.577E+00 | −3.741E+00 | 3.272E+00 | −1.449E+00 |
| R8 | −9.378E+00 | −5.801E−02 | −2.313E−01 | 6.781E−01 | −9.253E−01 | 7.363E−01 | −3.198E−01 | 5.414E−02 |
| R9 | −2.722E+01 | 7.799E−02 | −1.948E−01 | 6.108E−01 | −8.556E−01 | 6.097E−01 | −2.124E−01 | 2.712E−02 |
| R10 | −2.176E+00 | 1.311E−02 | −9.333E−02 | −5.411E−02 | 2.134E−01 | −1.444E−01 | 4.545E−02 | −6.480E−03 |
| R11 | −1.643E+01 | −1.511E−01 | −5.427E−02 | 8.216E−02 | −3.769E−02 | 1.029E−02 | −1.585E−03 | 9.955E−05 |
| R12 | −4.274E+00 | −1.713E−01 | 9.288E−02 | −4.072E−02 | 1.203E−02 | −2.111E−03 | 1.797E−04 | −4.207E−06 |

TABLE 15

| | |
|---|---|
| 2ω (°) | 130.04 |
| FNO | 2.04 |
| f (mm) | 1.869 |
| f1 (mm) | −7.442 |
| f2 (mm) | 10.878 |
| f3 (mm) | 3.029 |
| f4 (mm) | −12.090 |
| f5 (mm) | 1.715 |
| f6 (mm) | −2.142 |
| TTL (mm) | 5.400 |
| LB (mm) | 1.230 |
| IH (mm) | 2.619 |

As shown in Table 16, Embodiment 5 satisfies the conditions (1) to (6).

Figure 10:
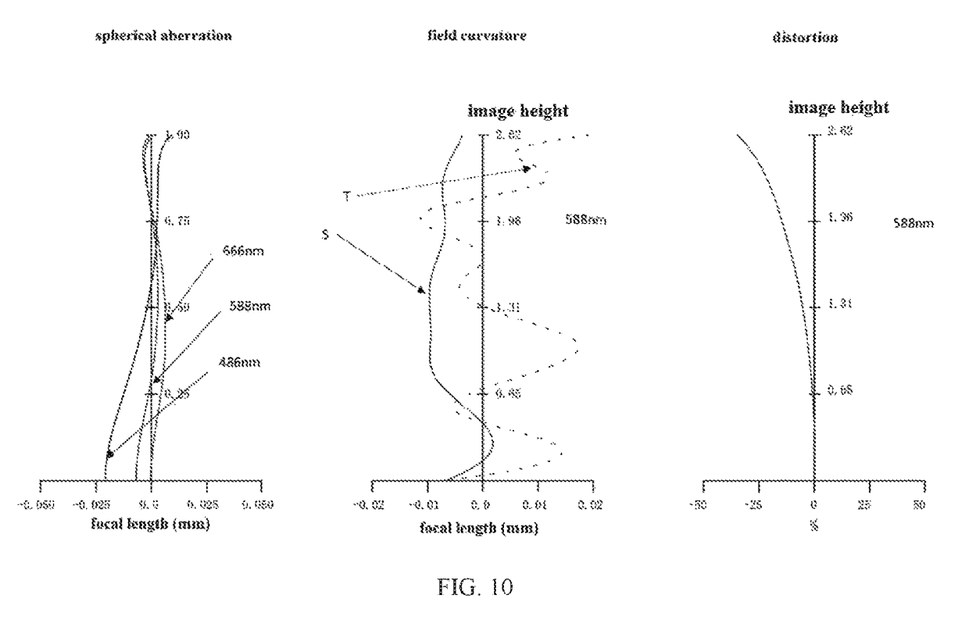
FIG. 10 is a schematic diagram of a spherical aberration, a field curvature and a distortion of the camera lens LA in accordance with Embodiment 5 of the present disclosure.

A spherical aberration, a field curvature and a distortion of the camera lens LA in Embodiment 5 are as shown in FIG. 10. It is known that the camera lens LA in Embodiment 5 is as shown in Table 15, FNO=2.04 is bright and 2ω=130.04° is wide, and as shown in FIG. 10, it has good optical characteristics.

Table 16 shows values corresponding to parameters defined by the conditions (1) to (6) of Embodiments 1-5.

TABLE 16

|  | Embodiment 1 | Embodiment 2 | Embodiment 3 | Embodiment 4 | Embodiment 5 | Notes |
| --- | --- | --- | --- | --- | --- | --- |
| f3/f | 1.621 | 1.361 | 1.621 | 1.621 | 1.621 | Condition (1) |
| f4/f | −4.771 | −3.955 | −9.584 | −7.988 | −6.469 | Condition (2) |
| R1/R2 | 0.765 | 0.705 | 0.260 | 0.339 | 0.438 | Condition (3) |
| v 3/v 4 | 3.996 | 3.996 | 4.000 | 3.775 | 3.573 | Condition (4) |
| R7/R8 | 1.874 | 1.850 | 1.253 | 1.307 | 1.385 | Condition (5) |
| f3/f4 | −0.340 | −0.344 | −0.169 | −0.203 | −0.251 | Condition (6) |

REFERENCE SIGNS

LA: camera lens
S1: aperture;
L1: first lens;
L2: second lens;
L3: third lens;
L4: fourth lens;
L5: fifth lens;
L6: sixth lens;
GF: glass plate;
R: curvature radius of an optical surface, a central curvature radius for a lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the glass plate GF;
R14: curvature radius of the image side surface of the glass plate GF;
d: center thickness of a lens and distance between lenses;
d1: center thickness of the first lens;
d2: on-axis distance from the image side surface of the first lens L1 to the object side surface of the second lens L2;
d3: center thickness of the second lens L2;
d4: on-axis distance from the image side surface of the second lens L2 to the aperture S1;
d5: on-axis distance from the aperture S1 to the object side surface of the third lens L3;
d6: center thickness of the third lens L3;
d7: on-axis distance from the image side surface of the third lens L3 to the object side surface of the fourth lens L4;
d8: center thickness of the fourth lens L4;
d9: on-axis distance from the image side surface of the fourth lens L4 to the object side surface of the fifth lens L5;
d10: center thickness of the fifth lens L5;
d11: on-axis distance from the image side surface of the fifth lens L5 to the object side surface of the sixth lens L6;
d12: center thickness of the sixth lens L6;
d13: on-axis distance from the image side surface of the sixth lens L6 to the object side surface of the glass plate GF;
d14: center thickness of the glass plate GF;
d15: on-axis distance from the image side surface of the glass plate GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6; and
nd7: refractive index of d line of the glass plate GF.

What is claimed is:

1. A camera lens, comprising, from an object side:
a first lens having a negative refractive power;
a second lens having a positive refractive power;
a third lens having a positive refractive power;
a fourth lens having a negative refractive power;
a fifth lens having a positive refractive power; and
a sixth lens having a negative refractive power,
wherein the camera lens satisfies following conditions:

$$1.35 \leq f3/f \leq 1.63;$$

$$-10.00 < f4/f \leq -3.50;$$

$$0.20 \leq R1/R2 \leq 0.80; \text{ and}$$

$$3.50 \leq v3/v4 \leq 4.10,$$

where
f denotes a focal length of the camera lens,
f3 denotes a focal length of the third lens,
f4 denotes a focal length of the fourth lens,
R1 denotes a curvature radius of an object side surface of the first lens,
R2 denotes a curvature radius of an image side surface of the first lens,
v3 denotes an abbe number of the third lens, and
v4 denotes an abbe number of the fourth lens.

2. The camera lens as claimed in claim 1, further satisfying a following condition:

$$1.20 \leq R7/R8 \leq 1.90,$$

where
R7 denotes a curvature radius of an object side surface of the fourth lens, and
R8 denotes a curvature radius of an image side surface of the fourth lens.

3. The camera lens as claimed in claim 1, further satisfying a following condition:

$$-0.40 \leq f3/f4 \leq -0.10.$$

* * * * *